Aug. 18, 1970 M. M. JALMA 3,524,302
LIQUID-TYPE GAS SCRUBBING EQUIPMENT
Filed July 17, 1968 2 Sheets-Sheet 1
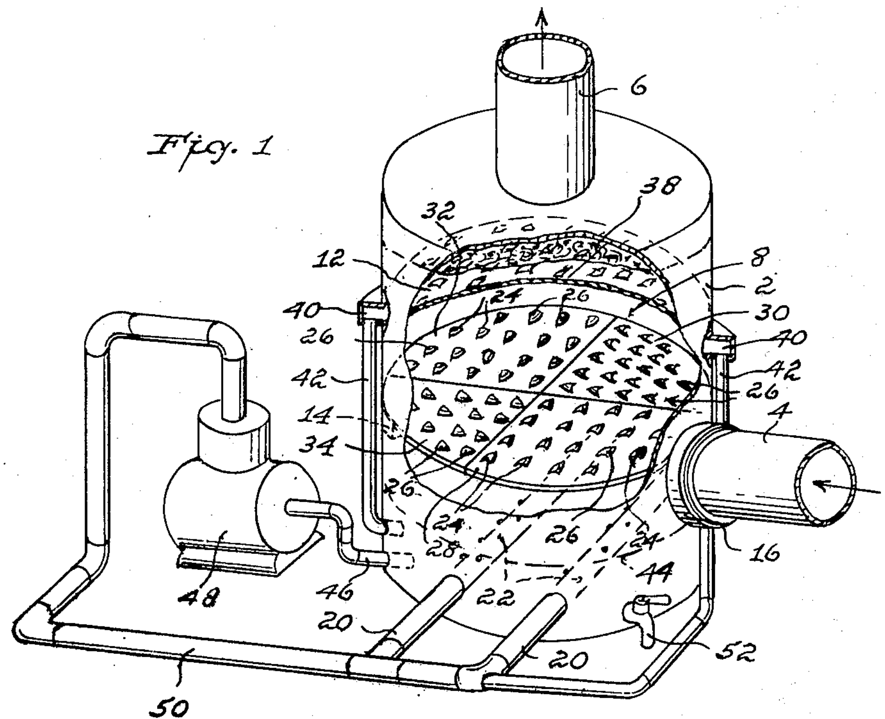
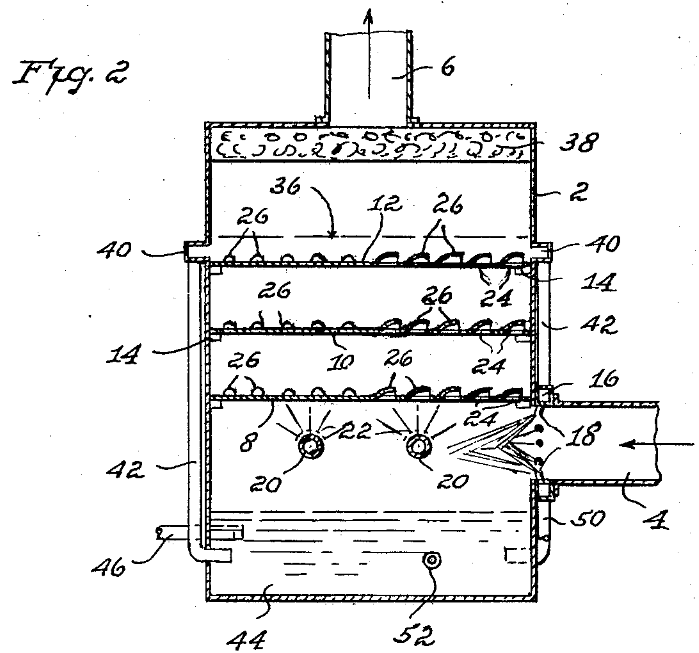
Michael M. Jalma
INVENTOR
BY Sperry and Zoda
ATTORNEYS

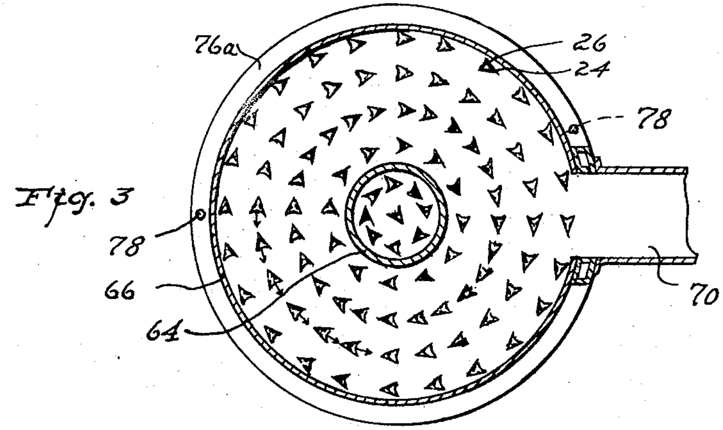
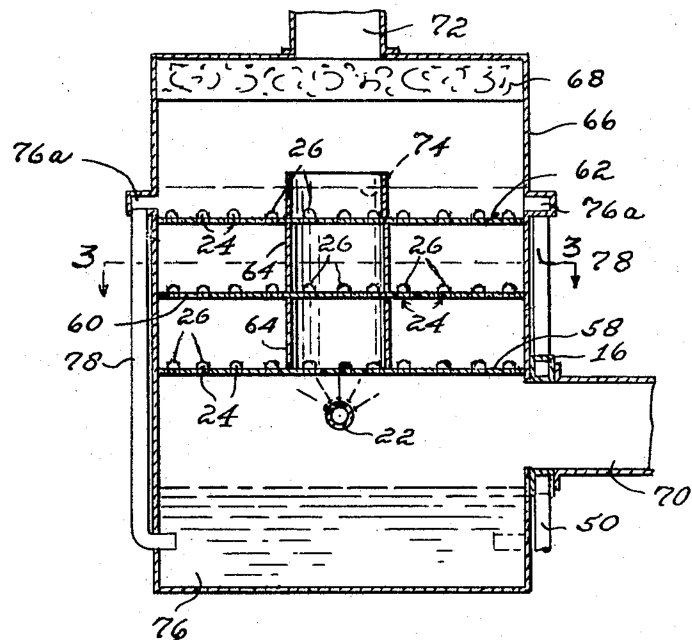
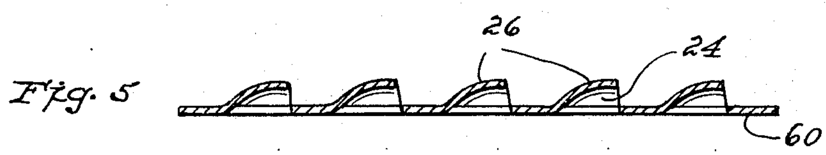
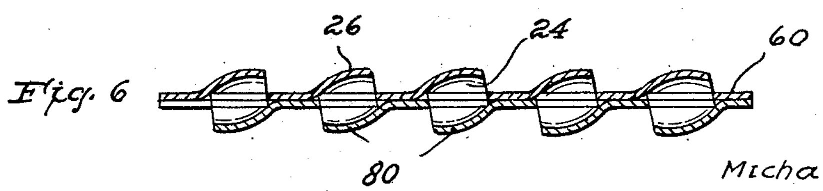
Michael M. Jalma
INVENTOR
BY Sperry and Zoda
ATTORNEYS United States Patent Office 3,524,302

Patented Aug. 18, 1970

1

3,524,302
LIQUID-TYPE GAS SCRUBBING EQUIPMENT

Michael M. Jalma, 410 Brookside Place, Cranford, N.J. 07016

Filed July 17, 1968, Ser. No. 745,568
Int. Cl. B01d 47/06
U.S. Cl. 55—238 2 Claims

ABSTRACT OF THE DISCLOSURE

Gas scrubbing equipment is provided with one or more horizontal plates having openings therein together with deflecting means positioned above the openings and arranged to direct gas and liquid passing through the openings in directions generally parallel to the upper surfaces of the plates. The deflecting means are so formed and arranged that a vigorous rotary motion is imparted to the gas and liquid as it passes upward through the equipment. The scrubbing liquid is projected upward against the lower surface of the lowermost plate and passes upward with the gases to the upper plates from which it is returned to a sump in the bottom of the equipment for recirculation while the scrubbed and cleaned gases pass outward from the upper portion of the equipment.

FIELD OF INVENTION

Many types of gas scrubbing equipment have been developed heretofore but in many devices of this type it has been necessary to provide relatively moving parts in order to effect an intimate contact between the gas and the scrubbing liquid used for removing contaminants therefrom. As a result the cost of producing and operating the equipment has been relatively high and even then the effectiveness of the scrubbing action has been rather limited.

In accordance with the present invention the only movable means employed are the pump and blower required for circulating the gas and liquid through the equipment. Nevertheless, the elements of the construction are so formed and arranged as to set up vigorous agitation and rotary circulation of the gases and scrubbing liquid whereby they are caused to travel over an extended path in intimate and turbulent contact so as to assure effective removal of contaminants from the gases. At the same time the size of the equipment and the cost of producing and operating the same are reduced to a minimum.

These advantages are attained by directing the gas and scrubbing liquid toward horizontal plates having openings therein with deflecting members positioned adjacent the openings. The gas to be scrubbed is introduced beneath the lowermost plate while scrubbing liquid is projected upward against the lower surface of the lowermost plate. The liquid is carried upward with the gas and through the openings in the plates while the deflecting means serve to cause both the gas and liquid to rotate and intermingle as they pass upward through the equipment.

2

THE DRAWINGS

FIG. 1 is a perspective illustrating one form of equipment embodying the present invention with parts of the housing therefor broken away;

FIG. 2 is a vertical sectional view through the equipment shown in FIG. 1;

FIG. 3 is a plan view of an alternative construction which may be embodied in the equipment of FIG. 1;

FIG. 4 is a view similar to FIG. 2 illustrating an alternative embodiment of the present invention; and FIGS. 5 and 6 are enlarged sectional views through typical deflector plates which may be used in the practice of the present invention.

PREFERRED EMBODIMENTS OF THE INVENTION

In that form of the invention chosen for purposes of illustration in the drawings, the equipment is provided with an outer casing or chamber 2 which may be square, cylindrical, or any other shape, and which has a gas inlet 4 near the lower portion thereof and a gas outlet 6 communicating with the upper portion of the chamber 2. Within the chamber 2, one or more deflecting plates indicated at 8, 10 and 12 are supported on brackets 14 or the like so as to be held in a substantially horizontal position transversely across the chamber 2. A gas inlet 4 is located below the lowermost deflector plate 8 and preferably also is provided with a hollow annular ring 16 to which washing liquid is supplied for spraying from the nozzles 18 into contact with the gases entering the equipment. In this way, the gases are given an initial scrubbing action which further may serve to lower the temperature of the gases prior to their passage into the space below the lowermost plate 8. Additional scrubbing liquid is sprayed vigorously upward against the lower surface of the deflector plate 8 from pipes 20 provided with spray nozzles 22.

As shown in FIGS. 1 and 5, the deflector plates 8, 10 and 12 have openings 24 through the plates above which extend deflecting members 26 which serve to cause the gas and liquid passing upwardly through the plates from beneath the same to flow generally horizontally over the upper surface of the plates. Further, as indicated in FIG. 1, the plates 8, 10 and 12 may be formed in segments 28, 30, 32 and 34 with the deflecting members 26 in each segment of the plate facing in the direction at 90° to the direction in which the deflecting members of an adjacent segment of the plates are directed.

In this construction, the liquid from the pipes 20 is sprayed forcibly upward against the lower surface of the lowermost plate 8 and is caused to pass through the openings 24 in the plate and to be deflected horizontally over the upper surface of the plate. At the same time, the angularly directed deflecting members 26 on the various segments of the plate 8 cause the liquid and gases to rotate about the interior of the casing 2 and in the gas scrubbing space between the adjacent plates 8 and 10 and 10 and 12. In actual practice it has been observed that the gas and scrubbing liquid passing through the openings in the plate 8 create a violently agitated mixture of gas and liquid which not only fills the gas scrubbing space between the plates 8 and 10 but also surges upward through the opening in the plate 10 filling the space between the plates 10 and 12 with a similar churning mass of gas and liquid. The gas and liquid further pass upwardly through the openings in plate 12 so that liquid generally accumulates in a bubbling pool above the upper surface of the plate 12 to a depth of from about three to six inches as indicated in dotted lines at 36.

The gases issuing above the layer 36 of the liquid on the upper plate 12 then flow on upward through a filter or mist collector 38 which serves to remove entrained droplets from the gases issuing through the outlet passage 6. The liquid thus removed from the gases returns to the pool 36 above the uppermost deflector plate 12. This liquid from the uppermost pool flows outward to an annular duct 40 and is returned through the pipe 42 to a reservoir of liquid 44 maintained in the lower portion of the chamber 2.

The washing liquid supplied to the annular duct 16 about the gas inlet pipe 4 and supplied to the pipes 20 to be sprayed upward against the under surface of the lowermost plate 8 may be withdrawn from the reservoir 44 through a pipe 46, leading to a pump 48 which serves to recirculate the scrubbing liquid through a discharge pipe 50 to annular duct 16 and spray pipe 20. A drain line 52 may be connected to the reservoir 44 in the lower portion of the chamber 2 to remove sludge and excess liquid from the equipment if desired. On the other hand, instead of recirculating the liquid continuously through the equipment, the scrubbing liquid supplied to the annular duct 16 and the spray pipes 20 may be fresh water or washing liquid supplied from any other suitable source.

Instead of employing plates 8, 10 and 12 which are formed in segments as illustrated in FIG. 1, each plate may be a unitary construction having the various openings and deflecting members arranged in annular positions throughout the plate as illustrated in FIG. 3, so as to provide for a continuous circular flow of the gases and liquids issuing through the openings in the plates to the upper surfaces thereof.

Further, as shown in FIG. 4, and as indicated in FIG. 3, each of the deflector plates designated 58, 60 and 62 may have the deflector members 26 thereon ararnged to assure an annular flow of gas and liquid about the central cylindrical tube 64 and between the outer surface of the tube 64 and the inner walls of the chamber 66. At the same time, gas and liquids also flow upward through the openings and past the deflecting members 26 within the tubular sleeves 64 so as to pass upward into the space between the uppermost plate 62 and a filter or mist collector 68 in the upper portion of the chamber 66. The gases enteering the chamber 66 through the inlet 70 below the lowermost plate 58 flow upward to the gas outlet 72 in either of two paths. Thus, some of the gas will flow upward and circulate about in the space between the tubular member 64 and the inner walls of the chamber 66, whereas a further portion of the gas will flow upward through the openings 24 into the tubular members 64 and then upward through the openings in the plates 60 and 62 into the space above the uppermost plate 62.

It is found in practice that the speed of rotation of the gases flowing upward through the tubular members 64 is somewhat higher than the speed of rotation of the gases through the larger space between the outer side of the tubular members 64 and the inner surface of the chamber 66. In each case, liquid is caused to flow upward with the gases so as to be maintained in an agitated body above each of the plates 58, 60 and 62. The presence of the tubular members 64 serves to assure the presence of liquid above the plates 58, 60 and 62 in the central portion of the equipment, whereas in the absence of the tubular members 64, it is found that there is some tendency for the centrifugal force of the liquid and gases to cause the scrubbing liquid to flow outward to the periphery of the plates 58, 60, and 62, leaving little or no scrubbing liquid in contact with the central portions of the plates. Accordingly, the presence of the tubular members 64 between the plates 58, 60 and 62 serves to assure a more even distribution of the liquid over the surfaces of each of the deflector plates in the equipment.

The liquid 74 accumulating above the uppermost plates 62 in the construction of FIG. 4 may be returned to the reservoir 76 in the lower portion of the chamber 66 through an annular duct 76*a* adjacent the upper surface of the uppermost plate 62 for return to the reservoir 76 through a pipe 78, or the like.

As illustrated in FIG. 6, it is sometimes desirable to provide the various plates 8, 10 and 12 or 58, 60 and 62 with downwardly projecting deflecting members 80 which aid in receiving and directing the liquid upwardly through the openings 24 to the upper portion of the plates. Further, as shown in FIG. 6, when the latter construction is employed, the plates may be formed of two adjacent layers of material A and B.

The number and size of the openings provided in the deflector plates may be varied considerably and the number of plates employed and the spacing of the plates vertically, one above the other can be varied as desired. Thus, from two to six plates spaced apart distances varying from three to nine inches have been found to operate very satisfactorily. In some instances, the plates have been arranged with the deflecting members therein facing in opposite directions so that the gases and liquids are caused to rotate in one direction as they pass through one plate and to rotate in the opposite direction when they pass through the next plate in a series. The amount of liquid used in scrubbing the gases has varied from about three to ten gallons per thousand cubic feet of gas being scrubbed. Repeated tests of the equipment shown and described has given a consistent scrubbing action of 99% and higher.

The apertured plates used in accordance with the present invention may also be used in combination with inclined plates of the type shown and described in copending application Ser. No. 745,567 filed July 17, 1968 to attain the combined scrubbing action of both types of equipment when desired.

It is, of course, possible to use any desired scrubbing liquid in the practice of the present invention, and the equipment may be employed for removing suspended material from substantially any type of industrial gases or fumes. When the suspended material is of value it can be effectively recovered from the washing liquid by draining off the liquid and passing it through a filter or sludge recovering device.

What is claimed is:

1. Gas scrubbing equipment comprising a vertically disposed housing presenting an inner cylindrical wall and having upper and lower portions, a gas inlet connected to and communicating with the lower portion of said housing, a gas outlet communicating with the upper portion of said housing, two horizontally disposed circular flat plates extending entirely across said housing in vertically spaced relation between said gas inlet and said gas outlet and establishing a scrubbing space within said housing, a tubular member of smaller diameter than said housing located in said scrubbing space and extending vertically from one of said flat plates to the other, whereby a path for the flow of gas and liquid is provided upwardly through said scrubbing space and within said tubular member and establishing another path of flow for gas and liquid upwardly through said scrubbing space and between said tubular member and the cylindrical wall of said housing, each of said horizontally disposed plates having openings therethrough throughout the surface area of the plates for the passage of gas and liquid through said plates and along both of said paths through said scrubbing space, means for spraying scrubbing liquid upwardly against the lowermost plate in said housing and deflecting members located on the upper surfaces of the plates at each of said openings to provide a rotary motion to a gas liquid mixture on said plates.

2. Gas scrubbing equipment as defined in claim 1, wherein the deflecting members located at the openings in said plates and all of which are inclined in the same direction.

References Cited

UNITED STATES PATENTS

| | | | |
|---|---|---|---|
| 139,665 | 6/1873 | Frazier | 261—109 |
| 1,831,805 | 11/1931 | Donaldson | 55—457 |
| 2,532,260 | 11/1950 | Lipton | 55—238 |
| 2,733,054 | 1/1956 | Ackeren | 261—117 |
| 2,772,080 | 11/1956 | Huggins et al. | 261—114 |
| 2,813,011 | 11/1957 | Weber | 261—79.1 |
| 3,024,012 | 3/1962 | Hardcastle et al. | 261—111 |
| 3,064,408 | 11/1962 | Erga et al. | 261—114 |
| 3,105,862 | 10/1963 | Doering | 261—114 |
| 3,175,340 | 3/1965 | Schulze | 55—94 |
| 3,266,224 | 8/1966 | Ferretti | 55—241 |
| 3,296,774 | 1/1967 | Hoogendoorn et al. | 55—92 |
| 3,315,445 | 4/1967 | Seversky | 55—238 |
| 3,409,409 | 11/1968 | Sackett | 55—233 |
| 948,432 | 2/1910 | Rudeen | 261—114 |
| 2,226,127 | 12/1940 | Harmon | 55—235 |

FOREIGN PATENTS

| | | |
|---|---|---|
| 481,802 | 3/1938 | Great Britain. |

FRANK W. LUTTER, Primary Examiner

B. NOZICK, Assistant Examiner

U.S. Cl. X.R.

55—240; 261—79